(12) United States Patent
Keller et al.

(10) Patent No.: US 10,159,056 B2
(45) Date of Patent: Dec. 18, 2018

(54) METHOD AND APPARATUS FOR REQUESTING AN INITIAL ATTACHMENT OF A UE TO PS MOBILE COMMUNICATION NETWORK

(71) Applicant: Telefonaktiebolaget LM Ericsson (publ), Stockholm (SE)

(72) Inventors: Ralf Keller, Würselen (DE); Ivo Sedlacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 15/101,055

(22) PCT Filed: Dec. 4, 2014

(86) PCT No.: PCT/EP2014/003235
§ 371 (c)(1),
(2) Date: Jun. 2, 2016

(87) PCT Pub. No.: WO2150/082071
PCT Pub. Date: Jun. 11, 2015

(65) Prior Publication Data
US 2016/0302168 A1 Oct. 13, 2016

Related U.S. Application Data

(60) Provisional application No. 61/912,841, filed on Dec. 6, 2013.

(51) Int. Cl.
| | |
|---|---|
| *H04W 48/18* | (2009.01) |
| *H04W 60/00* | (2009.01) |
| *H04W 76/10* | (2018.01) |
| *H04W 48/00* | (2009.01) |
| H04W 80/04 | (2009.01) |

(52) U.S. Cl.
CPC ........... *H04W 60/00* (2013.01); *H04W 48/17* (2013.01); *H04W 76/10* (2018.02); *H04W 80/04* (2013.01)

(58) Field of Classification Search
CPC ..... H04W 48/17; H04W 60/00; H04W 76/02; H04W 80/04
See application file for complete search history.

(56) References Cited

U.S. PATENT DOCUMENTS

2004/0209616 A1* 10/2004 Annic ................. H04W 48/08
455/434
2011/0026463 A1* 2/2011 Lair .................... H04W 76/041
370/328

(Continued)

FOREIGN PATENT DOCUMENTS

| EP | 2 568 761 A1 | 3/2013 |
|---|---|---|
| EP | 2 677 831 A1 | 12/2013 |
| WO | WO 2012/111409 A1 | 8/2012 |

OTHER PUBLICATIONS

International Search Report, Application No. PCT/EP2014/003235, dated Mar. 24, 2015.

(Continued)

*Primary Examiner* — Mohamed A Kamara
*Assistant Examiner* — Ryan C Kavleski
(74) *Attorney, Agent, or Firm* — Sage Patent Group (57) ABSTRACT

Methods are disclosed for requesting an initial attachment of a user equipment (UE) to a packet switched mobile communication network. One method includes analyzing the communication capability of the UE, determining an access point name (APN) based on the result of the analysis. The APN is an address of a gateway node between the packet switched mobile communication network and a further packet switched network. The APN is provided to a control node of the packet switched mobile communication network to establish a bearer to the gateway node. Corresponding operations performed by UEs are disclosed.

18 Claims, 4 Drawing Sheets

(56) References Cited

U.S. PATENT DOCUMENTS

| | | | |
|---|---|---|---|
| 2011/0249618 A1* | 10/2011 | Shaw | H04W 8/26 370/328 |
| 2012/0269128 A1* | 10/2012 | Nylander | H04W 48/17 370/328 |
| 2013/0083765 A1* | 4/2013 | Ai | H04W 4/70 370/329 |
| 2013/0315072 A1* | 11/2013 | Hietalahti | H04W 76/02 370/242 |
| 2014/0007200 A1* | 1/2014 | Zisimopoulos | H04L 63/102 726/4 |
| 2014/0177446 A1* | 6/2014 | Sun | H04L 45/38 370/236 |
| 2015/0043564 A1* | 2/2015 | Liu | H04W 76/022 370/338 |

OTHER PUBLICATIONS

Written Opinion of the International Searching Authority, Application No. PCT/EP2014/003235, dated Mar. 24, 2015.

3GPP, Technical Specification—"3rd Generation Partnership Project; Technical Specification Group Services and System Aspects; Architectural requirements (Release 11)", 3GPP TS 23.221 V11.2.0 (Jun. 2013), 51 pp.

3GPP, Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.2.0 (Sep. 2013), 293 pp.

3GPP, Technical Specification—3rd Generation Partnership Project; Technical Specification Group Core Network and Terminals; IP Multimedia (IM) Core Network (CN) subsystem Centralized Services (ICS); Stage 3 (Release 12), 3GPP TS 24.292 V12.1.0 (Sep. 2013), 178 pp.

GSM Association, Official Document IR.88—"LTE Roaming Guidelines", Version 9.0, Jan. 24, 2013, 53 pp.

GSM Association, Official Document IR.88—"LTE and EPC Roaming Guidelines", Version 10.0, Jul. 10, 2013, 53 pp.

GSM Association, Official Document IR.92—"IMS Profile for Voice and SMS", Version 7.0, Mar. 3, 2013, 32 pp.

GSM Association, Official Document IR.92—"IMS Profile for Voice and SMS", Version 8.0, Sep. 18, 2013, 36 pp.

* cited by examiner

METHOD AND APPARATUS FOR REQUESTING AN INITIAL ATTACHMENT OF A UE TO PS MOBILE COMMUNICATION NETWORK

CROSS REFERENCE TO RELATED APPLICATIONS

This application is a 35 U.S.C. § 371 national stage application of PCT International Application No. PCT/EP2014/003235, filed on Dec. 4, 2014, which itself claims the benefit of U.S. provisional Patent Application No. 61/912,841, filed Dec. 6, 2013, the disclosure and content of both of which are incorporated by reference herein in their entireties. The above-referenced PCT International Application was published in the English language as International Publication No. WO 2015/082071 A1 on Jun. 11, 2015.

All networks and mobile devices which provide voice services using PS domain in LTE are required to utilize a well-known access point name (APN) for Voice over LTE (VoLTE), namely, "IMS". Unlike many legacy networks, LTE networks, such as Evolved UMTS Terrestrial Radio Access Network (E-UTRAN), employ the "always-on" conception of packet connectivity. The LTE-devices have PDN connectivity virtually from the moment they perform their initial attach to the core network. VoLTE devices, which are according to standard GSMA PRD IR.92 Version 7.0 from March 2013, are not permitted to name the IMS APN or any other APN during the initial attach procedure. Unless IMS APN is the default APN, these devices are e.g. not allowed to utilize the IMS as their main PDN, but rather to establish a connection with the IMS APN separately after initial attach procedure if needed.

According to standard GSMA PRD IR.88 Version 9.0 from January 2013 a default APN is provisioned during the initial attach procedure by the operator in the Home Subscriber Server (HSS) in the core network. This default APN is then downloaded to the Mobility Management Entity (MME) which is responsible for the controlling of the Initial Attach procedure of an LTE device. After the Initial Attach procedure has been executed the device will establish separately, according to the needs of the user, a connection to a requested service, like IMS or the Internet, if the connection that has been established during the initial attach cannot be used for the intended communication. This results in an additional APN for addressing the respective Gateway to the external network. Therefore the device has reserved at least two different APNs even in the case that only one APN is currently needed for the provisioning of a service.

SUMMARY

Accordingly there is a demand to improve the Initial Attach procedure. This demand is achieved by the independent claims. Advantageous embodiments are described in the dependent claims.

According to a first aspect, a method of requesting an initial attachment of a user equipment, UE, to a packet switched mobile communication network is provided. The method comprises the step of analyzing the communication capability of the UE. In a further step an access point name, APN, is determined based on the result of the analysis, wherein the APN is an address of a gateway node between the packet switched mobile communication network and a further packet switched network. Further the APN is provided to a control node of the packet switched mobile communication network to establish a bearer to the gateway node.

According to a second aspect, a user equipment, UE, is provided. The UE comprises an analyzing entity, adapted to analyze the communication capability of the UE, a determining entity, adapted to determine an access point name, APN, based on the result of the analysis, wherein the APN is an address of a gateway node between the packet switched mobile communication network and a further packet switched network, and a sending entity, adapted to provide the APN to a control node of the packet switched mobile communication network during an initial attachment of the UE to a packet switched mobile communication network to establish a bearer to the gateway node.

BRIEF DESCRIPTION OF THE FIGURES

In the following, the present disclosure will further be described with reference to exemplary implementations illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with LTE standard terminology to illustrate the present invention, they are equally applicable to other kinds of mobile communication systems. Also, the invention may be practiced in any network to which mobile users may attach and are required to indicate access point name. For example, the present invention is applicable to, besides cellular networks, Local Area Networks (LANs) connected to Enhanced Packet Core (EPC), Wireless LANs (WLANs) connected to EPC, or similar wireless networks. Further, the term User Equipment (UE) used herein below may be any kind of mobile communication device like a mobile telephone, a Personal Digital Assistant (PDA), a network card, a laptop or any other mobile communication apparatus which is capable of communicating wirelessly (via an air interface) or wirelined with a network. Although a specific protocol stack is used below to describe the present invention, any other suitable protocol stack may equally be used. Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1:
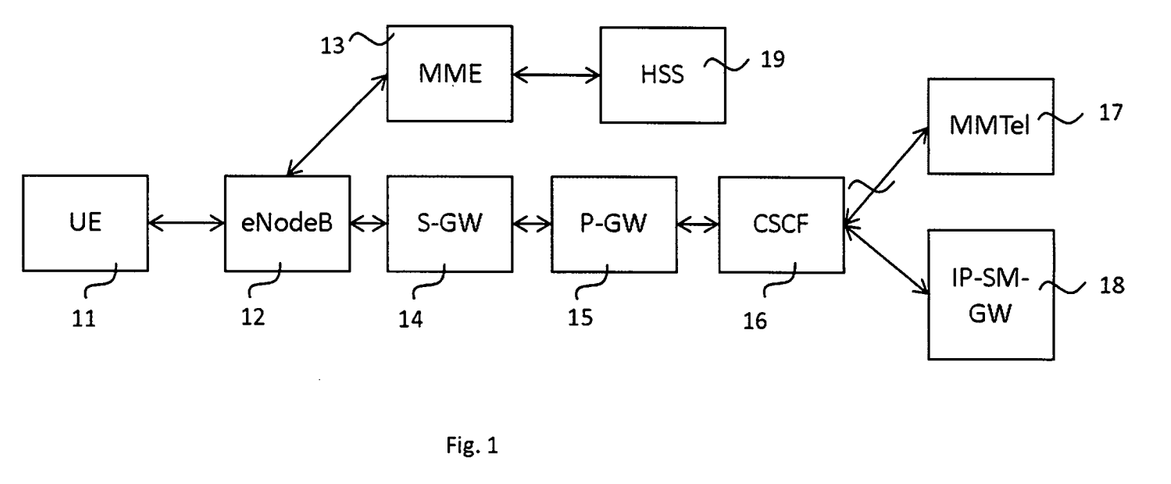
FIG. 1 schematically illustrates a block diagram of packet switched communication network according to GSMA standard IR.92.

FIG. 1 shows a block diagram of packet switched communication network to which UE 11 is connected according to GSMA standard IR.92 "IMS Profile for voice and SMS". In this diagram the packet switched communication network comprises an Evolved UMTS Terrestrial Radio Access Network (E-UTRAN) and an Evolved Packet Core (EPC) network. The E-UTRAN comprises a base station which may be an eNodeB 12 to which the UE 11 is connected over a radio link. The eNodeB 12 is connected to a Serving Gateway (S-GW) 14 which is adapted to route and forward user data packets in the mobile communication network. The S-GW 14 is also acting as the mobility anchor for the user plane during inter-eNodeB handovers and as the anchor for mobility between LTE and other 3GPP technologies. For idle state UEs, the S-GW 14 terminates the downlink data path and triggers paging when downlink data arrives for the UE. It manages and stores UE contexts, e.g. parameters of the IP bearer service, network internal routing information. It also performs replication of the user traffic in case of lawful interception. The S-GW 14 is further connected to a Mobility Management Entity (MME) 13. The MME 13 is the control-node for the LTE access-network. It is responsible for idle mode UE tracking and paging procedure including retransmissions. It is involved in the bearer activation/deactivation process and is also responsible for choosing the S-GW 14 for the UE 11 at the Initial Attach Procedure and at time of intra-LTE handover involving Core Network node relocation. The MME 13 is further responsible for authenticating the user. Therefore the MME 13 is interacting with a User database which is named a Home Subscriber Server (HSS) 19. The HSS 19 is a central database that contains user-related and subscription-related information. The functions of the HSS 19 include functionalities such as mobility management, call and session establishment support, user authentication and access authorization.

FIG. 1 further depicts a Packet Data Network (PDN) Gateway (P-GW) 15 which is connected to the P-GW 14 and provides connectivity from the UE 11 to further or external packet data networks or packet switched networks by being the point of exit, and entry of traffic for the UE 11. A UE 11 may have simultaneous connectivity with more than one P-GW 15 for accessing multiple PDNs. The P-GW 15 performs policy enforcement, packet filtering for each user, charging support, lawful interception and packet screening.

In addition to the depicted LTE nodes the network is connected to IMS over a Call Session Control Function (CSCF) 16 which is used to process SIP signalling packets in IMS and which is the first point of contact in the IMS for the IMS terminal or IMS capable UE 11. The CSCF 16 can be located either in a visited network (in full IMS networks) or in the home network (when the visited network is not IMS compliant yet) of the UE 11. Some networks may use a Session Border Controller (SBC) for this function. As a service function in IMS FIG. 1 further shows a Multimedia Telephony Service (MMTel) server 17 which is connected via the CSCF 16 to the EPC. The MMTel service is a global standard based on the IMS, offering converged, fixed and mobile real-time multimedia communication using the media capabilities such as voice, real-time video, text, file transfer and sharing of pictures, audio and video clips.

Figure 2:
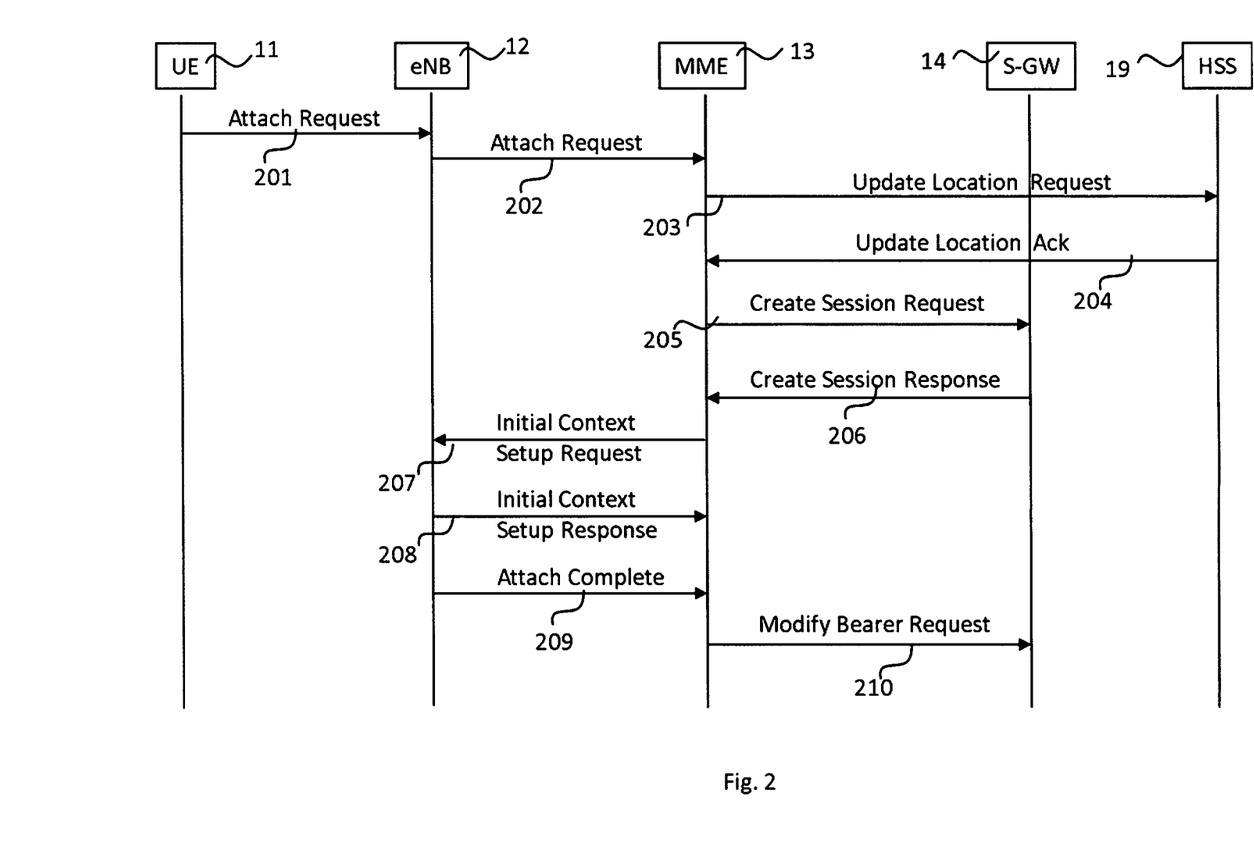
FIG. 2 schematically illustrates a sequence diagram according to one aspect of the invention.

FIG. 2 shows an Initial Attachment Procedure of a UE 11 to an E-UTRAN according to 3GPP standard 23.401 Version 12.2.0. This procedure is used to register the UE 11 with the mobile communication network to receive services, like voice services that require registration. This registration is described as Network Attachment. The always-on IP connectivity for UE/users of the EPS is enabled by establishing a default EPS bearer during this Network Attachment. The Attach procedure according to FIG. 2 may trigger one or multiple Dedicated Bearer Establishment procedures to establish dedicated EPS bearer(s) for that UE 11. This procedure is also used to establish the first PDN connection over E-UTRAN.

In a first step the UE 11 sends an Attach Request message 201 to an eNodeB 12 in the E-UTRAN for initiating the Attach procedure by the transmission, to the eNodeB (eNB) 12 of an Attach Request. According to one embodiment of the invention the Attach Request message 201 comprises an APN which has been set up by the UE 11. Before the Attach Request message 201 has been sent to the eNB 12, the UE analyzed its communication capability and determined an APN, based on the result of the analysis. The APN is an address of a gateway node between the packet switched mobile communication network and a further packet switched network. The gateway node may the S-GW 14 or any other node which comprises any gateway functionality. The eNB 12 derives the address of the responsible MME 13 from parameters encapsulated in the Attach Request message 201 and forwards the Attach Request message 202 towards the determined MME 13. If the MME 13 has changed since the last detach, or if there is no valid subscription context for the UE 11 in the MME 13, the MME 13 sends an Update Location Request 203 to the HSS 19 comprising at least the identity of the UE 11, the identity of the MME 13 and different service indications. After the HSS 19 has informed the old MME about the cancellation of the location, the HSS 19 acknowledges the Update Location message by sending an Update Location Ack message 204 to the new MME 13.

The MME 13 selects an S-GW 14 on Serving GW selection function and allocates an EPS Bearer Identity for the Default Bearer associated with the UE 11 by sending a Create Session Request 205 to the selected S-GW 14. The MME 13 initiates the default route establishment by asking the S-GW 14 to create a GTP tunnel. The source is identified by the fully qualified endpoint identifier with the Tunnel Endpoint Identifier (TEID) and the MME IP address. The IP address assigned to the UE is also included in this message along with the downlink and uplink maximum data rates allowed at the APN level.

If the UE 11 does not provide an APN, the MME 13 shall use the PDN GW corresponding to a default APN, provided by the HSS 19, for default bearer activation. If the UE 11 is using a different service after Initial Attachment which is not using the default bearer, a second bearer has to be established. This results in an undue quantity of reserved bearers.

According to one embodiment of the invention the APN is provided by the UE 11 and shall be, employed for default bearer activation. The provided APN is related to the communication capability of the UE 11 which results in a high chance that the default bearer, established in the Initial Attachment Procedure, is later on used when the UE 11 is served by the network.

FIG. 2 further shows an Initial Context Setup Procedure between the MME 13 and the eNB 12 comprising a Request message 207, sent from the MME 13 to the eNB 12 and a Response message 208, sent from the eNB 12 to the MME 13. This procedure is used to establish a context between the MME 13 and the eNB 12 and the Request message 207 comprises S-GW tunneling information. Further the Request message 207 acknowledges the successful attach of the UE 11 and initiates the default bearer setup on the UE 11. The eNB 12 will pass this Request message 207 to the UE 11. With the Attach complete message 209, sent from the eNB 12 to the MME 13 the Initial Attachment Procedure is completed and the default bearer has been activated. In a Modify Bearer Request message 210 the MME 13 informs the S-GW 14 about the eNB's user plane IP address and the GTP TEID.

It is to be understood that the message flow diagram is merely schematic and that the flow diagram may actually include further messages and nodes which, for the sake of clarity, have not been illustrated.

The invention is about a UE selecting whether to include an APN or not. If the UE decided to include an APN it is determined with which APN the UE has to do its initial attachment procedure, based on UE communication capabilities, user's preference on usage of non-IMS data services, whether it is roaming or not, and based on the operator's policy (structured in prioritized list of <condition, APN>). The usage of the operator's policy can therefore be implemented by storing the list in the UE or in the USIM. The USIM may store the operator's policy and the APN selection is based on operator's requests and provides the operator's policy for the APN selection to the UE.

Figure 3:
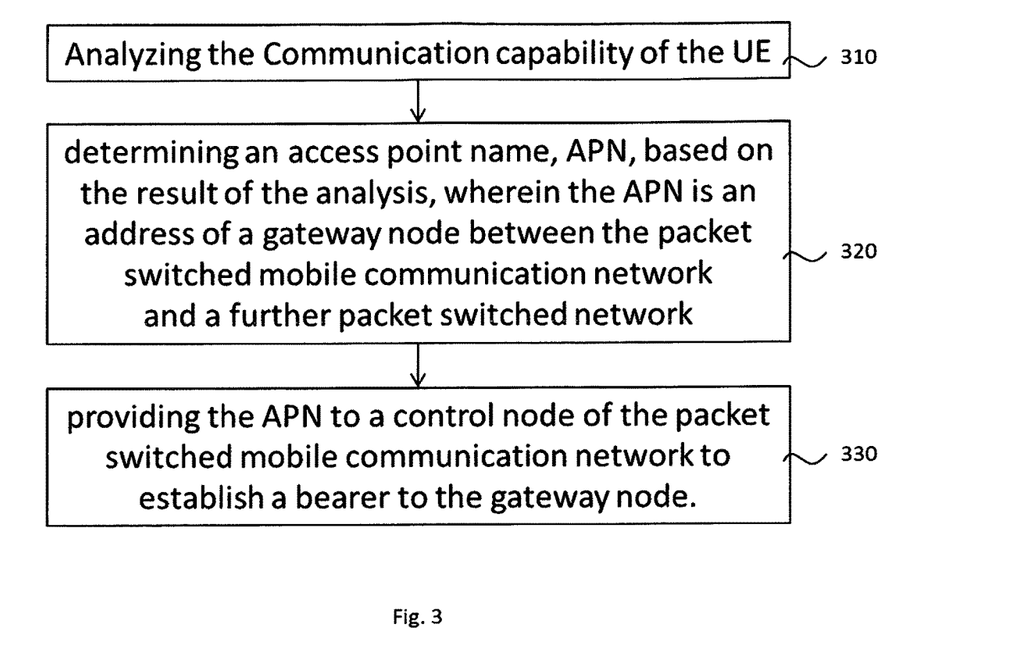
FIG. 3 schematically illustrates a flowchart of a method according to one embodiment of the invention.

FIG. 3 shows an exemplary flow diagram of the invention. In a first step 310 the communication capability of the UE 11 is analyzed. This can be done internally in the UE 11 by determining set up parameters of the UE 11. These parameters may be pre-stored in the UE 11 by an operator of a communication network. If a subscription is changed the operator may send a configuration SMS to the UE 11 to update the respective parameters. It may also be possible that these parameters are stored in the Universal Subscriber Identity Module (USIM) which is provided by the operator. It may be determined that the UE 11 is a voice centric device. The UE 11 is configured as a voice centric device if the UE 11 shall always try to ensure that voice service is possible. If the UE 11 is served by an E-UTRAN in which CSFB and IMS voice service are not supported, it should disable E-UTRAN capability and select GERAN or UTRAN for being connected to voice services. It may be determined that the UE 11 is a data centric device. The UE 11 is configured as a data centric device if the UE 11 remains at E-UTRAN even if no voice service can be provided.

It may also be possible that the UE 11 is configured with a Voice_Domain_Preference_E_UTRAN indicator, indicating the network operator's preference for selection of the domain to be used for voice communication services by the UE 11. As one possibility the UE 11 may be configured to use IMS Voice only. This preference indicates that the UE 11 attempts to initiate voice session over IM CN Subsystem using an E-UTRAN bearer. In addition, the UE 11, upon receiving a request for a session including voice; attempts to use an E-UTRAN bearer for all the audio media stream(s). This indication equates to "IMS PS Voice only" as described in 3GPP standard 23.221. The UE 11 may also be configured to prefer IMS Voice with circuit switched, CS, voice as secondary. This preference indicates that the UE preferably attempts to use the IM CN Subsystem using an E-UTRAN bearer to originate sessions including voice. In addition, the UE 11, in accordance with 3GPP TS 24.292, upon receiving a request for a session including voice, preferably attempts to use an E-UTRAN bearer for the audio media stream. This indication equates to "IMS PS Voice preferred, CS Voice as secondary" as described in 3GPP TS 23.221. It may also be possible that the UE 11 may be configured to prefer CS Voice with IMS Voice as secondary. This preference indicates that the UE 11 preferably attempts to use the CS domain to originate voice sessions. In addition, the UE 11, in accordance with 3GPP TS 24.292, upon receiving a request for a session including voice, preferably attempts to use the CS domain for the audio media stream. This indication equates to "CS Voice preferred, IMS PS Voice as secondary" as described in 3GPP TS 23.221. It may also be possible that the UE 11 may be configured to use CS voice only. This preference indicates that the UE 11 does not attempt to initiate voice sessions over the IM CN Subsystem using an E-UTRAN bearer. This value equates to "CS Voice only" as described in 3GPP TS 23.221.

The communication capability may also be fetched from the type of the UE 11. If the UE is a tablet computer with only limited voice capability it may be identified as a data centric device. If the UE 11 is a legacy mobile phone it may be identified as a voice centric device. It may also be possible that the UE 11 is an LTE device which is identified as an IMS Voice preferred device. The communication capability of the UE may comprise a capability of providing voice service and/or data service in dependence of the radio access technology and the technology of the core network.

In another embodiment of the invention a user preference is analyzed. This user preference may indicate a preferred network to which the user of the UE preferably connects to for using a service. This user preference may take into account whether the UE attaches to a home network (Home Public Land Mobile Network, H-PLMN) to which the user of the UE has a subscription or whether the UE attaches to a Visited PLMN which is different to the home network and to which the user of the UE does not have a subscription. If the UE attaches to a H-PLMN the user of the UE will normally have better conditions regarding services and prices. If the UE attaches to a V-PLMN—the UE roams into a V-PLMN—the conditions are often worse than if the UE is attached to an H-PLMN. It may be possible that the provisioning of services, like accessing the Internet, is much more expensive (e.g. additional roaming fees) in the V-PLMN than in the H-PLMN of the UE. If the UE of a user attaches to a V-PLMN he may change the user preference. It may be possible that if the UE is attached to a V-PLMN the Internet-service is disabled. If the UE is attached to an H-PLMN the Internet service should be available. It may also be possible that even if the UE is attached in the H-PLMN the availability of the Internet access service is disabled if the UE is able to attach to a Wireless LAN network (WLAN).

In a next step 320 an access point name, APN, is determined based on the result of the analysis of the communication capability of the UE 11. The APN is an address of a gateway node between the packet switched mobile communication network and a further packet switched network. In another embodiment the determination step 320 comprises additionally the determination of an APN based on the user preference.

The APN may be fetched from a list of APNs which are stored in relation to the communication capability of the UE 11 and/or the user preference at a USIM card which is inserted into the UE 11. This USIM is normally provided by an operator to which the user of the UE 11 has a subscription. It may be possible that more than one communication capability or preference regarding the UE is applicable. According to an embodiment of the invention the list may be sorted in a priority order. If the first entry is valid then all other entries should not be considered further on. The UE will then take the first APN. If the third entry is the first entry in this list the UE will take this entry without further determining possible other matches. With this kind of priority-ordered list it may be possible that user preferences and communication capabilities may be mixed up. As an example the prioritized list of APNs may be structured like this to implement a policy:

Priority 1: When user's preference is to enable non-IMS data services regardless of UE is roaming or not, the policy indicates to the UE to indicate APN="internet" during initial attach;

Priority 2: When user's preference is to enable non-IMS data services in the home network only and the UE is attaching to its H-PLMN, the policy indicates to UE to indicate APN="internet" during initial attach;

Priority 3: When Voice_Domain_Preference_E_UTRAN indicates a value other than "CS voice only", the policy indicates to the UE to indicate APN="IMS" during initial attach Priority 4: When Voice_Domain_Preference_E_UTRAN indicates "CS voice only", the policy can indicate to disable E-UTRAN and instead use GERAN/UTRAN In a last step 330 the APN is provided to a control node of the packet switched mobile communication network to establish a bearer to the gateway node.

Figure 4:
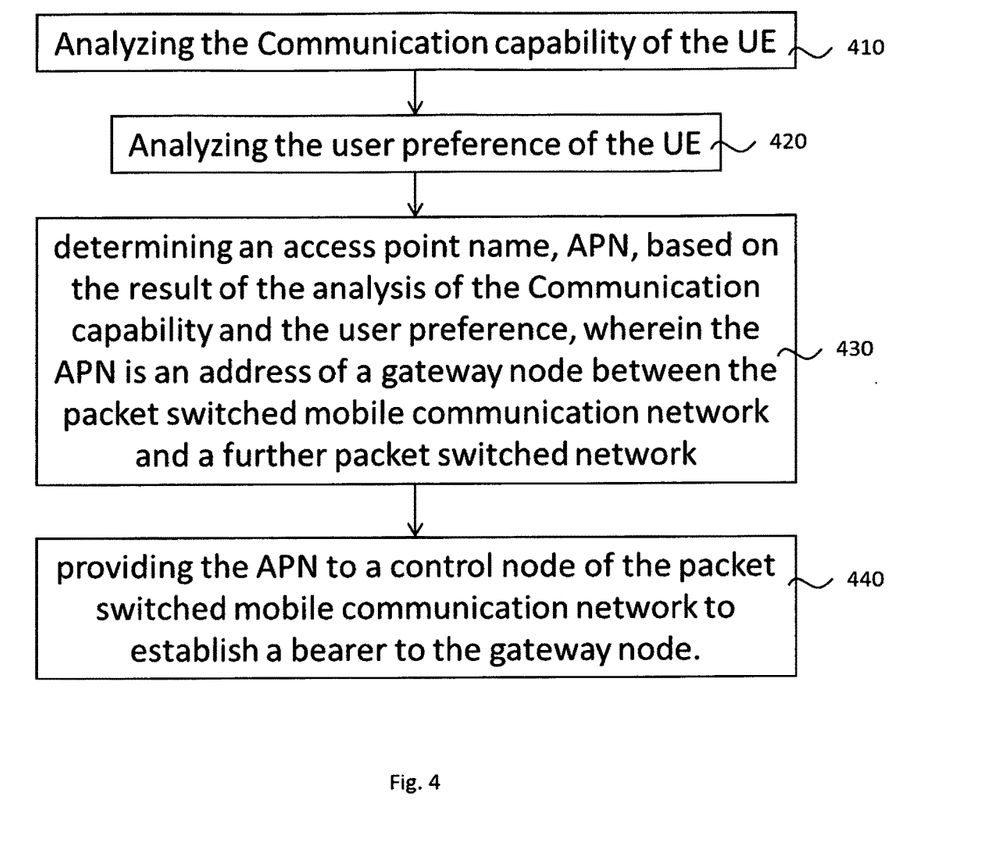
FIG. 4 schematically illustrates a flowchart of a method according to, another embodiment of the invention.

FIG. 4 depicts another embodiment of the invention in which the step 410 is comparable to the step 310 of FIG. 3 and step 440 is comparable to step 330 of FIG. 3. This embodiment shows an additional step 420, comprising the analysis of the user preference of the UE. This user preference is determined in dependence of the subscription of the UE to the packet switched mobile communication network to which the UE requests the initial attachment. It may be possible that the user preference for a UE which requests an attachment to a home public land mobile network, H-PLMN, to which the UE has a subscription, is different to a user preference for a. UE which requests an attachment to a visited public land mobile network, V-PLMN, which is different to the H-PLMN. The user preference may comprise the identity of the further packet switched network which is preferred by the UE. This preferred further packet switched network may be the Internet or any other network which is preferably used by the user based on the requested services.

The next step 430 is comparable to step 320 of FIG. 3 and comprises additionally the feature that the determination of the APN is also based on the user preference.

Figure 5:
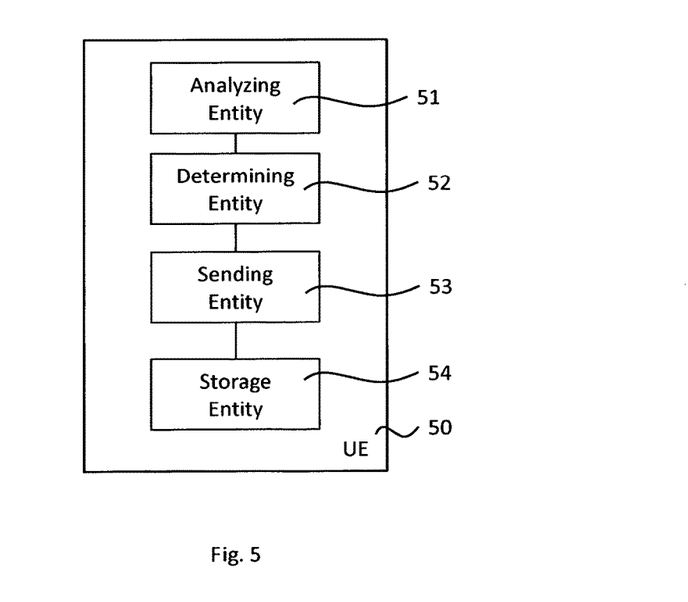
FIG. 5 schematically illustrates the composition of an user equipment according to one aspect of the invention.

FIG. 5 depicts a UE 50 according to an embodiment of the invention. The UE 50 comprises an analyzing entity 51, adapted to analyze the communication capability of the UE 50. Further the UE 50 comprises a determining entity 52, adapted to determine an access point name, APN, based on the result of the analysis, wherein the APN is an address of a gateway node between the packet switched mobile communication network and a further packet switched network. Further the UE 50 comprises a sending entity 53, adapted to provide the APN to a control node of the packet switched mobile communication network during an initial attachment of the UE 50 to a packet switched mobile communication network to establish a bearer to the gateway node. Further the UE 50 may comprise a storage entity 54 which is adapted to store the list of APN in relation to the communication capabilities or the user preferences so that the determining entity can fetch the corresponding APN from this list. The storage entity 54 may be a USIM or a memory in the UE 50.

It is to be understood that the structure as illustrated in FIG. 5 is merely schematic and that the UE 50 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

The invention claimed is:

1. A method of requesting an initial attachment of a user equipment, UE, to a packet switched mobile communication network, comprising the steps of:
   analyzing, by the UE, the communication capability of the UE by determining whether the UE is:
      a voice centric device which is configured to select a network based on voice service availability such that the voice centric device is configured to select a network with voice service support when available, or
      a data centric device which is configured to select a network based on data service availability such that the data centric device is configured to not take into account voice service support when selecting a network;
   analyzing, by the UE, a user preference, stored in the UE;
   determining, by the UE, an access point name, APN, based on the result of the analysis of the communication capability of the UE and the analysis of the user preference, wherein the APN is an address of a gateway node between the packet switched mobile communication network and a further packet switched network, wherein the APN is determined from a list of APNs which are related to the communication capabilities of the UE and the user preference and wherein the list is arranged in priority order such that an APN with a highest priority is determined as the APN; and
   transmitting, by the UE, via a network, the APN to a control node of the packet switched mobile communication network to establish a bearer to the gateway node.

2. The method according to claim 1, wherein the user preference is determined in dependence of the subscription of the UE to the packet switched mobile communication network to which the UE requests the initial attachment.

3. The method according to claim 2, wherein the user preference is related to the following condition:
   the UE requests an attachment to a home public land mobile network, H-PLMN, to which the UE has a subscription; or the UE requests an attachment to a visited public land mobile network, V-PLMN, which is different to the H-PLMN.

4. The method according to claim 1, wherein the user preference comprises the identity of the further packet switched network which is preferred by the UE.

5. The method according to claim 4, wherein a preferred further packet switched network is the Internet.

6. A method of requesting an initial attachment of a user equipment, UE, to a packet switched mobile communication network, comprising the steps of:
   analyzing, by the UE, the communication capability of the UE, wherein the communication capability of the UE comprises a capability of providing voice service and/or data service in dependence of the radio access technology and the technology of the core network such that if the UE is a voice centric device, the UE is configured to select a network with voice service support when available, or if the UE is a data centric device, the UE is configured to not take into account voice service support when selecting a network;
   analyzing, by the UE, a user preference, stored in the UE;
   determining, by the UE, an access point name, APN, based on the result of the analysis of the communication capability of the UE and the analysis of the user preference, wherein the APN is an address of a gateway node between the packet switched mobile communication network and a further packet switched network, wherein the APN is determined from a list of APNs which are related to the communication capabilities of the UE and the user preference and wherein the list is arranged in priority order such that an APN with a highest priority is determined as the APN; and
   transmitting, by the UE, via a network, the APN to a control node of the packet switched mobile communication network to establish a bearer to the gateway node.

7. The method according to claim 1, wherein the further packet switched network is an IP Multimedia Subsystem, IMS, network and the APN is an address to a gateway node of the IMS network, IMS APN.

8. The method according to claim 1, wherein when the communication capability of the UE indicates that the UE is a voice centric device, the analyzing step further comprises the step of determining whether the UE is configured to:
   use IMS Voice only,
   prefer IMS Voice with circuit switched, CS, voice as secondary,
   prefer CS Voice with IMS Voice as secondary, or
   use CS voice only.

9. The method according to claim 1, wherein the list of APNs is stored in the memory of a Universal Subscriber Identity Module, USIM.

10. The method according to claim 1, wherein the list of APNs is stored in a memory of the UE.

11. The method according to claim 1, wherein the determined APN is encapsulated in an Initial Attach Request message, sent from the UE to the control node.

12. The method according to claim 1, wherein the packet switched mobile communication network is an Evolved Packet Core, EPC, network, the control node is a Mobility Management Entity, MME and the UE is connected to the EPC over an Evolved UMTS Terrestrial Radio Access Network, E-UTRAN.

13. A user equipment, UE, comprising:
   at least one processor; and
   at least one memory coupled to the at least one processor and storing computer readable program code that when executed by the at least one processor causes the at least one processor to perform operations to:
      analyze the communication capability of the UE by determining whether the UE is:
         a voice centric device which is configured to select a network based on voice service availability such that the voice centric device is configured to select a network with voice service support when available, or
         a data centric device which is configured to select a network based on data service availability such that the data centric device is configured to not take into account voice service support when selecting a network;
      analyze a user preference stored in the UE;
      determine an access point name, APN, based on the result of the analysis of the communication capability of the UE and the user preference stored in the UE, wherein the APN is an address of a gateway node between the packet switched mobile communication network and a further packet switched network, wherein the APN is determined from a list of APNs which are related to the communication capabilities of the UE and the user preference, and wherein the list of APNs is arranged in a priority order such that an APN with a highest priority is determined as the APN; and
      transmit the APN, via a network, to a control node of the packet switched mobile communication network during an initial attachment of the UE to the packet switched mobile communication network to establish a bearer to the gateway node.

14. A computer program product comprising a non-transitory computer readable storage medium storing instructions which, when executed on at least one processor, cause the at least one processor to carry out the method according to claim 1.

15. The method according to claim 1 further comprising updating the user preference responsive to a change of the subscription of the UE to the packet switched mobile communication network to which the UE requests the initial attachment.

16. The method according to claim 1 wherein analyzing the communication capabilities comprises analyzing set up parameters of the UE.

17. The method according to claim 1 wherein determining the APN with the highest priority comprises:
   responsive to determining whether the APN with the highest priority is available and selecting the APN with the highest priority as the APN when the APN with the highest priority is available; and
   responsive to the APN with the highest priority not being available, determining whether an APN with a next highest priority is available and selecting the APN with the next highest priority as the APN when the APN with the next highest priority is available.

18. The method according to claim 1 wherein the list of APNs is further arranged based on the communication capabilities of the UE and the user preference.

* * * * *